US011251596B2

(12) United States Patent
Doultremont et al.

(10) Patent No.: US 11,251,596 B2
(45) Date of Patent: Feb. 15, 2022

(54) GEL SEAL AND SYSTEM INCORPORATING GEL SEAL

(71) Applicant: COMMSCOPE CONNECTIVITY BELGIUM BVBA, Kessel-Lo (BE)

(72) Inventors: Pieter Doultremont, Kermt-Hasselt (BE); Eddy Luc Cams, Bilzen (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/492,020

(22) PCT Filed: Mar. 8, 2018

(86) PCT No.: PCT/EP2018/055851
§ 371 (c)(1),
(2) Date: Sep. 6, 2019

(87) PCT Pub. No.: WO2018/162691
PCT Pub. Date: Sep. 13, 2018

(65) Prior Publication Data
US 2020/0106254 A1  Apr. 2, 2020

Related U.S. Application Data

(60) Provisional application No. 62/469,058, filed on Mar. 9, 2017.

(51) Int. Cl.
*H02G 15/013* (2006.01)
*H02G 3/08* (2006.01)
(Continued)

(52) U.S. Cl.
CPC .......... *H02G 15/013* (2013.01); *H02G 3/083* (2013.01); *H01B 17/30* (2013.01); *H02G 3/22* (2013.01); *H02G 15/04* (2013.01); *H02G 15/113* (2013.01)

(58) Field of Classification Search
CPC ........ H02G 3/083; H02G 3/22; H02G 15/013; H02G 15/14; H02G 15/113; H01B 117/30; H01B 17/30
See application file for complete search history.

(56) References Cited

U.S. PATENT DOCUMENTS 3,183,302 A * 5/1965 Wochner .............. H02G 15/113
174/138 F
5,003,278 A * 3/1991 May ....................... H01F 17/06
174/92

(Continued)

FOREIGN PATENT DOCUMENTS

CN          101039019 A      9/2007
EP          0 514 174 A1    11/1992
(Continued)

OTHER PUBLICATIONS

International Search Report and Written Opinion of the International Searching Authority for International Patent Application No. PCT/EP2018/055851 dated Jun. 13, 2018, 13 pages.

*Primary Examiner* — Paresh H Paghadal
(74) *Attorney, Agent, or Firm* — Merchant & Gould P.C.

(57) ABSTRACT

Disclosed herein is a gel seal including a volume of gel between first and second end plates. The first and second end plates have one or more cable ports with a central longitudinal axis extending through the first end plate, the volume of gel, and the second end plate. The cable port has a first, circular cross-sectional profile in the first and second end plates for receiving a round cable and a second, elongate cross-sectional profile in the first and second end plates for receiving a flat cable.

6 Claims, 10 Drawing Sheets (51) Int. Cl.
*H02G 15/113* (2006.01)
*H01B 17/30* (2006.01)
*H02G 15/04* (2006.01)
*H02G 3/22* (2006.01)

(56) References Cited

U.S. PATENT DOCUMENTS

| | | | | |
|---|---|---|---|---|
| 5,675,124 | A * | 10/1997 | Stough | G02B 6/4471 |
| | | | | 174/656 |
| 5,775,702 | A * | 7/1998 | Laeremans | H02G 15/013 |
| | | | | 277/314 |
| 6,046,406 | A * | 4/2000 | Milanowski | H02G 15/013 |
| | | | | 174/77 R |
| 6,118,076 | A * | 9/2000 | Damm | H02G 15/113 |
| | | | | 174/77 R |
| 7,799,995 | B2 * | 9/2010 | Mullaney | H02G 15/013 |
| | | | | 174/77 R |
| 10,381,814 | B1 * | 8/2019 | Pritchard | H01R 4/12 |
| 2002/0062977 | A1 * | 5/2002 | Battey | G02B 6/4471 |
| | | | | 174/93 |
| 2002/0180163 | A1 * | 12/2002 | Muller | H02G 15/013 |
| | | | | 277/602 |
| 2004/0100028 | A1 * | 5/2004 | Desard | H02G 15/013 |
| | | | | 277/314 |
| 2009/0309313 | A1 * | 12/2009 | Knorr | G02B 6/4444 |
| | | | | 277/626 |
| 2012/0230644 | A1 | 9/2012 | Marmon et al. | |
| 2014/0220803 | A1 * | 8/2014 | Genta | H01R 13/5216 |
| | | | | 439/271 |
| 2015/0168664 | A1 * | 6/2015 | Coenegracht | H02G 15/013 |
| | | | | 385/135 |
| 2017/0003467 | A1 | 1/2017 | Jaksons et al. | |
| 2017/0045701 | A1 | 2/2017 | Diepstraten et al. | |

FOREIGN PATENT DOCUMENTS

| | | |
|---|---|---|
| EP | 0 749 641 A1 | 12/1996 |
| WO | 2014/005916 A2 | 1/2014 |
| WO | 2016/128572 A1 | 8/2016 |
| WO | 2016/205340 A1 | 12/2016 |

* cited by examiner

GEL SEAL AND SYSTEM INCORPORATING GEL SEAL

CROSS-REFERENCE TO RELATED APPLICATION

This application is a National Stage Application of PCT/EP2018/055851, filed on Mar. 8, 2018, which claims the benefit of U.S. Patent Application Ser. No. 62/469,058, filed on Mar. 9, 2017, the disclosures of which incorporated herein by reference in their entireties. To the extent appropriate, a claim of priority is made to each of the above disclosed applications.

TECHNICAL FIELD

The present disclosure relates generally to pressurized gel seals for sealing cable entry points of enclosures.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers.

Telecommunications enclosures are typically sealed to inhibit the intrusion of moisture or other contaminants. Pressurized gel-type seals have been used to effectively seal the locations where telecommunications cables enter and exit telecommunications enclosures. Pressurized gel-type seals are disclosed, for example, in WO 2014/005916 A2. While pressurized gel-type cable seals have generally proven to be effective, improvements in this area are still needed.

SUMMARY

One aspect of the present disclosure relates to a gel seal. The gel seal comprises a volume of gel between first and second end plates. The first and second end plates have one or more cable ports with a central longitudinal axis extending through the first end plate, the volume of gel, and the second end plate. The cable port has a first, circular cross-sectional profile in the first and second end plates for receiving a round cable. The cable port also has a second, elongate cross-sectional profile in the first and second end plates for receiving a flat cable.

Another aspect of the present disclosure relates to a system incorporating the gel seal. The system comprises a housing containing the gel seal disclosed herein and an exterior cable anchoring structure attached to the housing. The exterior cable anchoring structure comprising a cable anchoring plate including a first row of cable tie mounts and a second row of cable tie mounts. The system further comprises a flat cable guide containing at least one channel. The flat cable guide is positioned on the cable anchoring plate between the first row of cable tie mounts and the second row of cable tie mounts so that a mid-point of the channel aligns with the central longitudinal axis of the cable port. The channel is configured to receive a flat cable extending from the cable port. The system also comprises cable ties configured to secure the flat cable to a first cable tie mount in the first row of cable tie mounts and a second cable tie mount in the second row of cable tie mounts.

DETAILED DESCRIPTION

Disclosed herein is a gel seal with cable port(s) accomodating both round cables and flat cables. The gel seal is advantageous because its cable port(s) can accommodate and seal both types of cables. The gel seal is further advantageous because its cable port(s) can accommodate and seal various sizes of both round cables and flat cables. As used herein, the term "round cable" means a cable having a cross-section that is circular. The term "flat cable" means a cable that has a more rectangular cross-section than a round cable such that the cable has a cross-sectional length that is longer than its cross-sectional width. An example of a flat cable is a flat drop cable.

A first, circular cross-sectional profile accomodates and seals round cables, while a second, elongate cross-sectional profile accomodates and seals flat cables. Thus, the cable port(s) of the gel seal provide two ports in one for sealing round cables, flat cables, or a combination of flat cables and round cables. Accordingly, the gel seal can adapt to a desired configuration of round and flat drop cables.

Aspects of the present disclosure relate to a gel seal that is in the form of a module that can be removed from and inserted into a telecommunications enclosure. Many telecommunications enclosures are "re-enterable" meaning that the telecommunications enclosures can be reopened to allow access to the telecommunications components housed therein, including gel seals. For example, telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. When the gel seal as disclosed herein is in the form of a module, different numbers of gel seals and gel seals having different numbers of cable ports can be removed from and inserted into the telecommunications enclosure creating a customizable and/or adaptable sealing arrangement.

Aspects of the present disclosure also relate to a gel seal that is easy to use. For example, aspects of the present disclosure relate to a gel seal that is separable into an upper portion and a lower portion facilitating simple placement of a cable into a cable port of the gel seal, rather than requiring insertion of a cable through the cable port.

Also disclosed herein is a system including a gel seal as disclosed herein along with a flat cable guide for receiving, mounting, and aligning a flat cable sealed in the gel seal.

In the following detailed description, reference is made to the accompanying drawings showing by way of illustration specific embodiments of a gel seal and a system containing the gel seal disclosed herein. It is to be understood that other embodiments may be utilized and structural or logical changes may be made without departing from the scope of the present disclosure. The following detailed description, therefore, is not to be taken in a limiting sense.

Figure 1A:
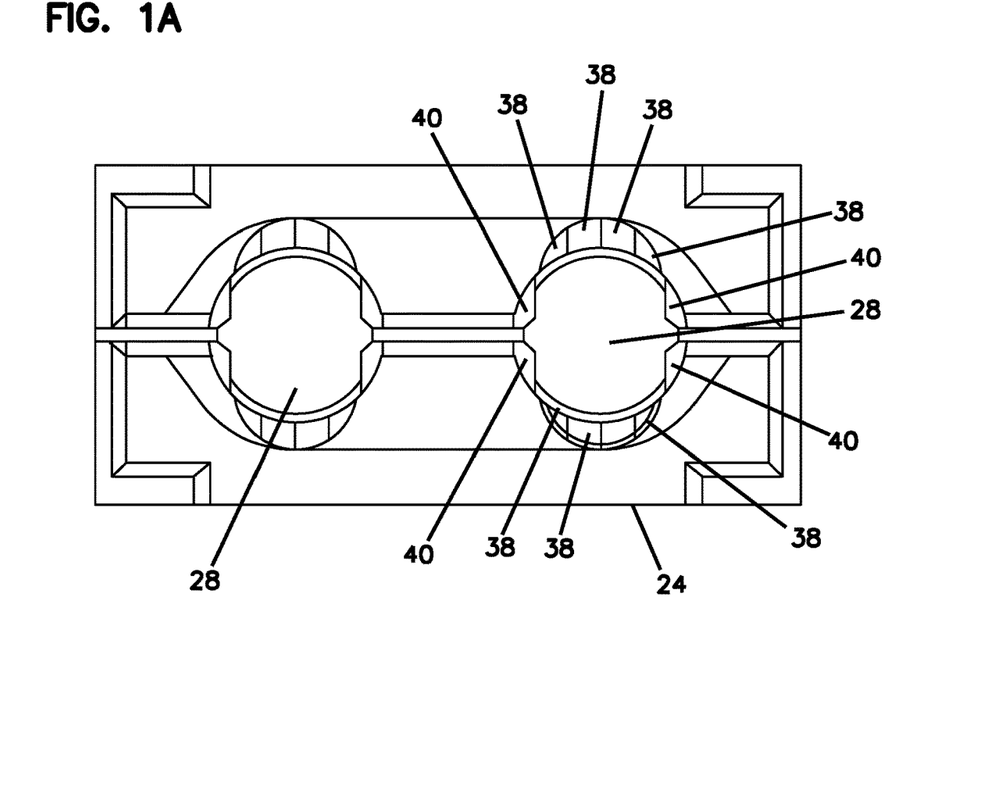
FIG. 1A shows a front view of an embodiment of a gel seal.
Figure 1B:
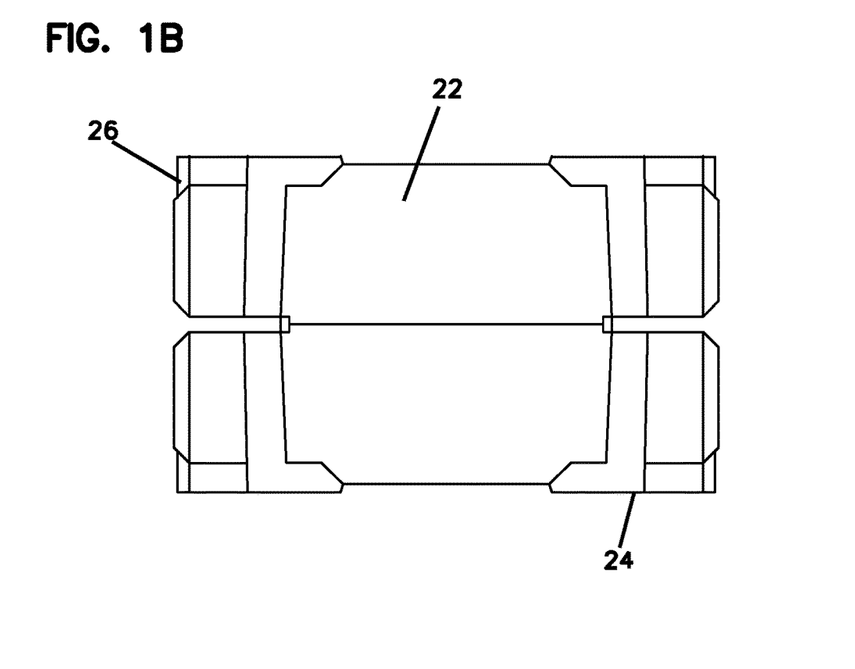
FIG. 1B shows a side view of the embodiment of the gel seal of FIG. 1A.
Figure 1C:
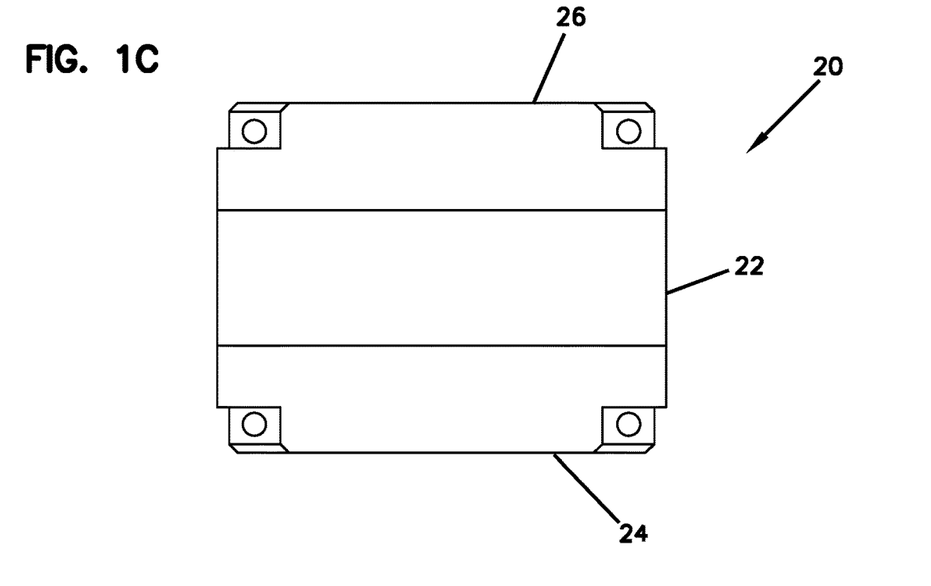
FIG. 1C shows a top view of the embodiment of the gel seal of FIG. 1A.
Figure 1D:
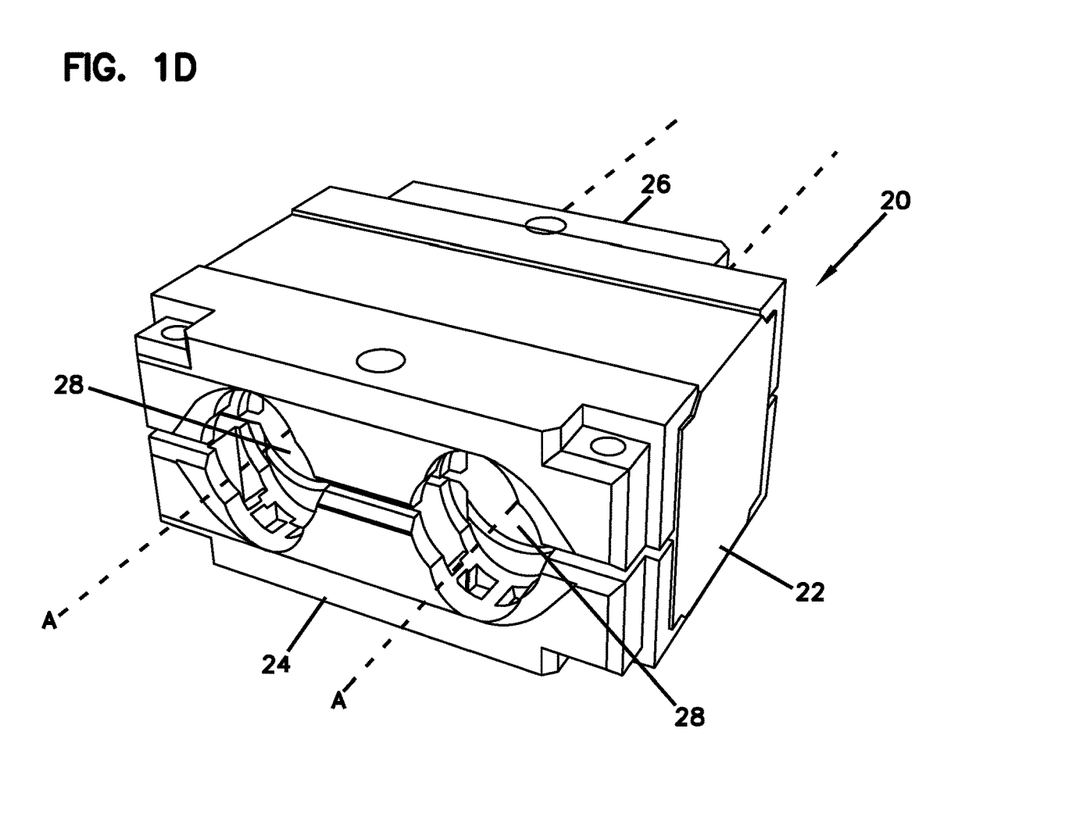
FIG. 1D is a perspective view of the embodiment of the gel seal of FIG. 1A.

FIGS. 1A-1D disclose an embodiment of the gel seal disclosed herein. Turning to FIG. 1D, a gel seal 20 includes a volume of gel 22, a first end plate 24, and a second end plate 26. The volume of gel 22 is located between the first end plate 24 and the second end plate 26. Each of the first end plate 24 and the second end plate 26 include one or more cable ports 28. The cable ports 28 each have a central longitudinal axis A extending through the first end plate 24, the second end plate 26, and the volume of gel 22.

The embodiment depicted includes two cable ports 28, each having a central longitudinal axis A. However, it is appreciated that the gel seal 20 may include a single cable port or three or more cable ports depending upon the size of the gel seal 20.

Each cable port 28 has a first, circular cross-sectional profile and a second, elongate cross-sectional profile in the first and second end plates 24, 26. The cross-sectional profiles are best depicted in FIGS. 3A and 3B.

Figure 3A:
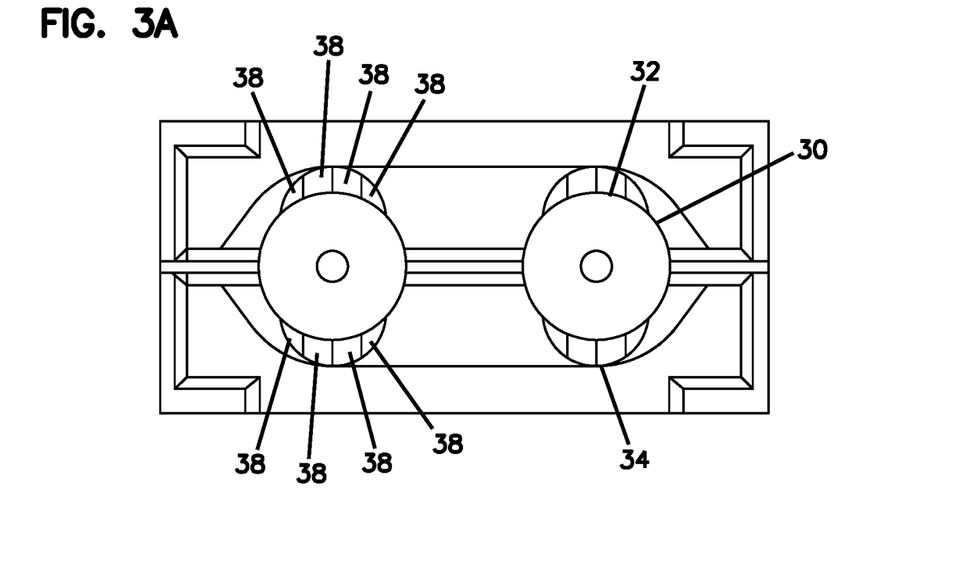
FIG. 3A shows a front view of the gel seal of FIG. 1A with round cables in the cable ports.
Figure 3B:
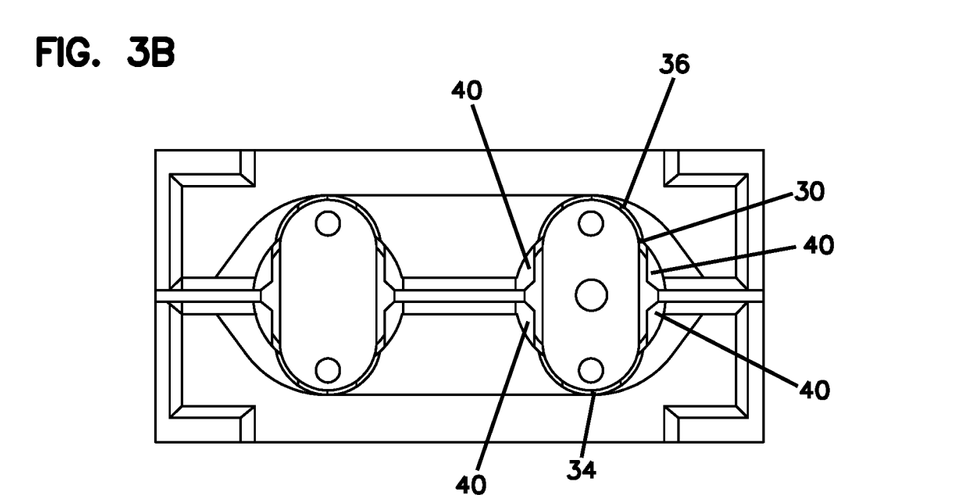
FIG. 3B shows a front view of the gel seal of FIG. 1A with flat cables in the cable ports.

FIG. 3A shows the first, circular cross-sectional profile 30 of each cable port 28 for receiving a round cable 32. FIG. 3B shows the second, elongate cross-sectional profile 34 of each cable port 28 for receiving a flat cable 36. The second, elonage cross-sectional profile 34 generally has a shape similar to, analogous to, or matching the shape of a cross-section of a flat cable 36. In the embodiment depicted in FIG. 3B, the second, elongate cross-sectional profile 34 is a rectangle having rounded corners.

Although the cable port 28 in the first and second end plates 24, 26 include both the first, circular cross-sectional profile 30 and the second, elongate cross-sectional profile 34, in the gel 22, the cable port 28 has the first, circular cross-sectional profile 30. In the gel 22, the cable port 28 need only have this single cross-sectional profile because the gel deforms under pressure when the gel is compressed between the first and second end plates 24, 26. Upon pressurization and deformation of the gel 22, the cable port 28 in the gel 22 will accommodate and seal both round cables and flat cables.

It will be appreciated that various materials can be used to form the gel. The gel may also be combined with another material such as an elastomer. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The gel can also include additives such as moisture scavengers, antioxidants, tackifiers, pigments and/or fungicides. In certain embodiments, the gel in accordance with the principles of the present disclosure has ultimate elongations greater than 100 percent with substantially elastic deformation to an elongation of at least 100 percent. In other embodiments, the gel in accordance with the principles of the present disclosure has ultimate elongations of at least 200 percent, or at least 500 percent, or at least 1000 percent. Ultimate elongation can be determined by the testing protocol set forth at ASTM D412. In one example, the gel has a shore hardness between about 24 and about 35 shore 000 hardness.

The first and second end plates 24, 26 can include collapsible partitions 38 that protrude into the second, elongate cross-sectional profile 34. These collapsible partitions 38 define a portion of the first, circular cross-sectional profile 30. The first and second plates 24, 26 can further include secondary collapsible partitions 40 that protrude into the first, circular cross-sectional profile 30. These secondary collapsible partitions 40 define a portion of the second, elongate cross-sectional profile 34.

Figure 2:
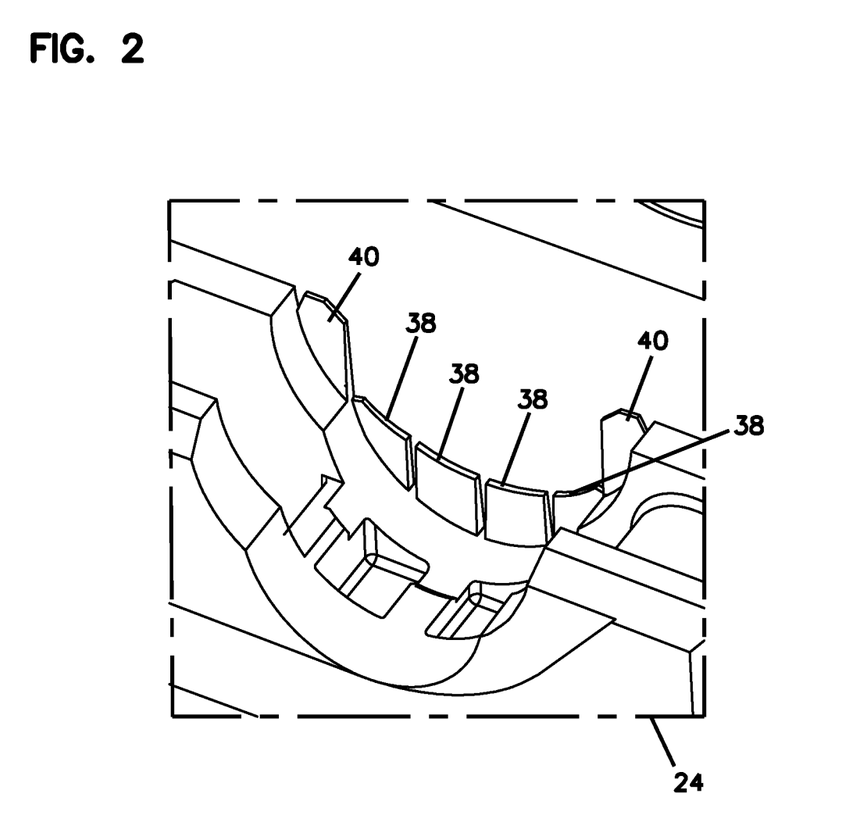
FIG. 2 depicts collapsible partitions and secondary collapsible partitions of cross-sectional profiles of a cable port in an end plate of the embodiment of the gel seal of FIG. 1A.

FIG. 2 shows a close-up view of a portion of the cross-sectional profiles 30, 34 in the first end plate 24. As shown in FIG. 2, the collapsible partitions 38 protrude into the second, elongate cross-sectional profile 34 to define a portion of the first, circular cross-sectional profile 30. The secondary collapsilbe partitions 40, protrude into the first, circular cross-sectional profile 30 to define a portion of the second, elongate cross-sectional profile 34.

FIG. 3A also shows the definition of a portion of the first, circular cross-sectional profile 30 by the collapsible partitions 38. Similarly, FIG. 3B shows the definition of a portion of the second, elongate cross-sectional profile 34 by the secondary collapsible partitions 40.

In the embodiment of the gel seal 20 shown in the figures, the collapsible partitions 38 protrude into the second, elongate cross-sectional profile 34 at an upper portion and a lower portion of the second, elongate cross-sectional profile 34. However, the collapsible partitions 38 may instead protrude into the second, elongate cross-sectional profile 34 on opposing sides of the second, elongate cross-sectional profile 34. The secondary collapsible partitions 40 protrude into the first, circular cross-sectional profile 30 on opposing sides of the first, circular cross-sectional profile 30. However, the secondary collapsible partitions 40 may instead protrude into the first, circular cross-sectional profile 30 at an upper portion and a lower portion of the first, circular cross-sectional profile 30.

When a round cable 32 is inserted in or through the first end plate 24 or second end plate 26, the secondary collapsible partitions 40 collapse permitting the round cable 32 to enter the cable port 28 through the first, circular cross-sectional profile 30. When the round cable 32 is inserted in or through the cable port 28 into the gel 22, the round cable 32 may displace some gel 22. Also, pressurization of the gel 22 between the end plates 24, 26 may displace some gel 22. The collapsible partitions 38 contain the gel 22 and prevent the gel 22 from leaking out of the cable port 28.

Conversely, when a flat cable 36 is inserted in or through the first end plate 24 or second end plate 26, the collapsible partitions 38 collapse permitting the flat cable 36 to enter the cable port 28 through the second, elongate cross-sectional profile 34. When the flat cable 36 is inserted in or through the cable port 28 into the gel 22, the flat cable 36 may displace some gel 22. Also, pressurization of the gel 22 between the end plates 24, 26 may displace some gel 22. The secondary collapsible partitions 40 contain the gel 22 and prevent the gel 22 from leaking out of the cable port 28.

Generally, the collapsible partitions 38 and the secondary collapsible partitions 40 are structures that prevent gel 22 from leaking out of the cable port 28, but permit entry of the round cable 32 (in the case of the secondary collapsible partitions 40) and permit entry of the flat cable 36 (in the case of the collapsible partitions 38). Thus, the collapsible partitions 38 and the secondary collapsible partitions 40 do not collapse in response to the force/pressure of the gel 22, but collapse in response to the force/pressure of the cables. The collapsible partitions 38 can be a plurality of tabs retractable into the first and second end plates 24, 26. Similarly, the secondary collapsible partitions 40 can be a plurality of tabs retractable into the first and second end plates 24, 26. Alternatively, the collapsible partitions 38 can be a plurality of bendable tabs. Similarly, the secondary collapsible partitions 40 can be a plurality of bendable tabs.

Figure 4A:
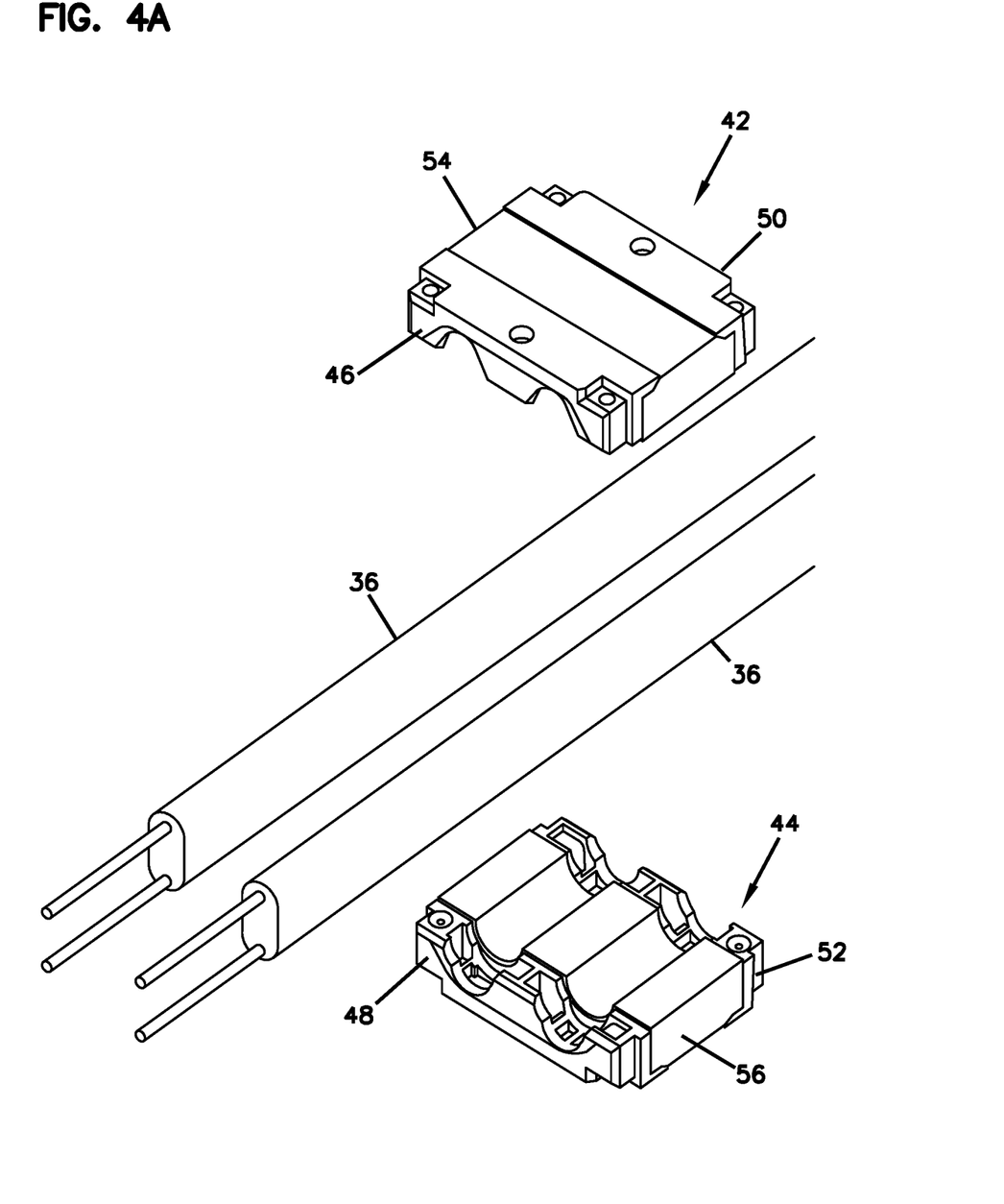
FIG. 4A depicts an embodiment of a gel seal having an upper portion separable from a lower portion.
Figure 4B:
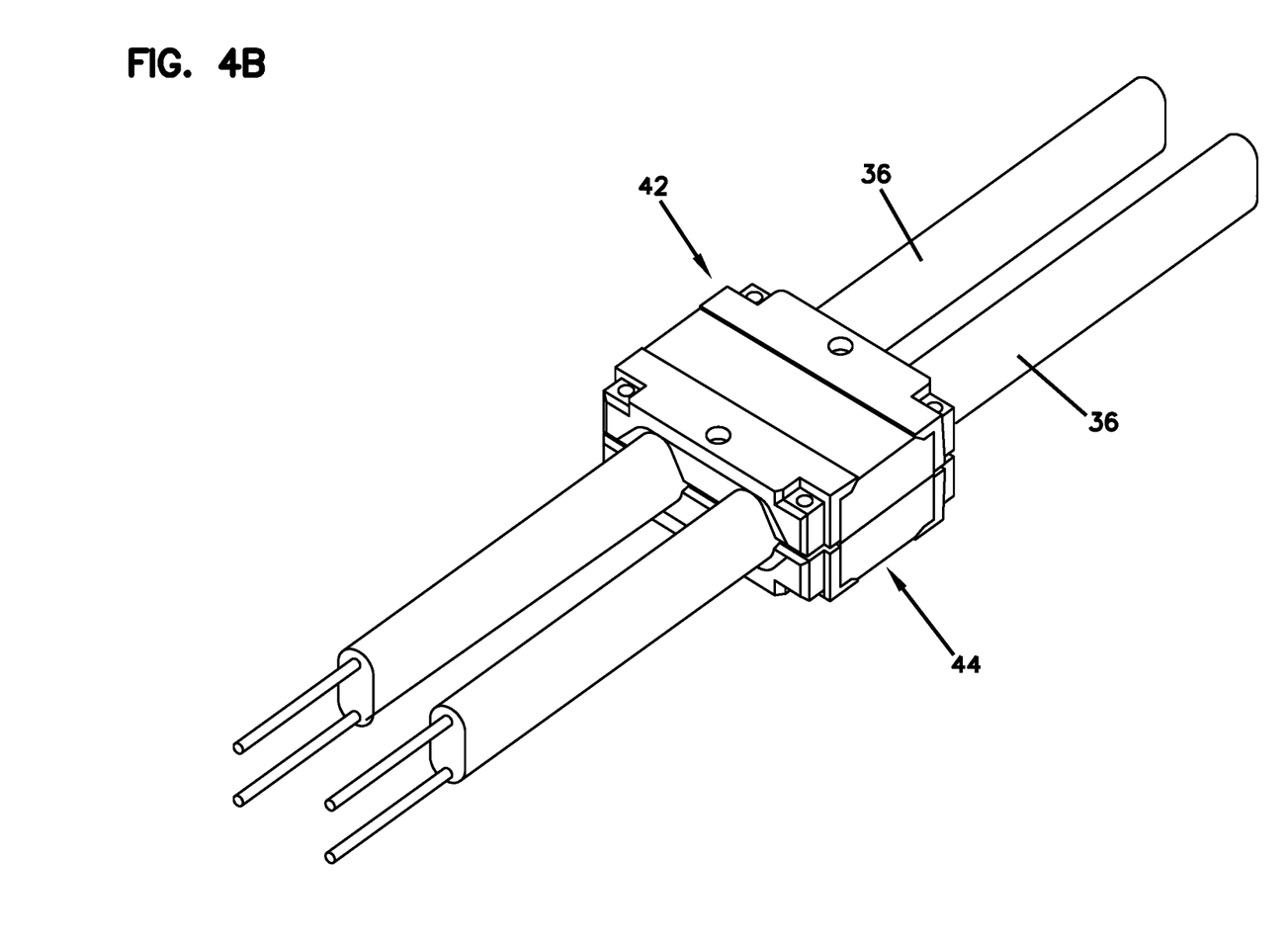
FIG. 4B depicts the gel seal of FIG. 4A with the upper portion and lower portion sealing flat cables in the cable ports.

FIGS. 4A and 4B show an embodiment of the gel seal 20 having an upper portion 42 separable from a lower portion 44. In this embodiment, the first end plate 24 includes a first end plate upper portion 46 and a second end plate lower portion 48. Likewise, the second end plate 26 includes a second end plate upper portion 50 and a second end plate lower portion 52. The volume of gel 22 similarly includes an upper volume of gel 54 and a lower volume of gel 56. The upper volume of gel 54 is located between the first end plate upper portion 46 and the second end plate upper portion 50. The lower volume of gel 56 is located between the first end plate lower portion 48 and the second end plate lower portion 52. As shown in this embodiment, the first end plate upper portion 46 and the second end plate upper portion 50 define an upper half of the first, circular cross-sectional profile 30 and the second, elongate cross-sectional profile 34. In the same manner, the first end plate lower portion 48 and the second end plate lower portion 52 define a lower half of the first, circular cross-sectional profile 30 and the second, elongate cross-sectional profile 34.

With the embodiment shown in FIGS. 4A and 4B, the upper portion 42 of the gel seal 20 can be detached and separated from the lower portion 44 or vice versa to permit placement of a round cable 32 or a flat cable 36 in the cable port(s) 28. Then the upper portion 42 can be united with and secured to the lower portion 44 or vice versa to seal the round cable 32 or the flat cable 36 in the cable port(s) 28.

The upper portion 42 and the lower portion 44 can be attached to one another by any means known in the art (e.g. threaded fasteners such as screws). This embodiment with the upper portion 42 separable from the lower portion 44 does not require pushing the cable 32, 36 through the cable port 28. Rather, the cable 32, 36 can be conveniently laid on the gel 22 in the cable port 28 inside either the upper portion 42 or the lower portion 44. When the upper portion 42 and the lower portion 44 are united and pressurized, the gel 22 is compressed between the upper portion 42 and the lower portion 44 sealing the cable 32, 36.

The gel seal 20 may be constructed so that various sizes of round cables and various sizes of flat cables may be sealed. For example, the first, circular cross-sectional profile 30 may be configured to receive a round cable 32 having a diameter between about 9 mm and about 12 mm. As another example, the second, elongate cross-sectional profile 34 may be configured to receive a flat cable 36 having a cross-sectional length of about 16 mm and a cross-sectional width of about 8 mm.

According to one embodiment, the gel seal is a module insertable into and removable from a cable sealing unit A cable sealing unit generally contains a plurality of gel seals insertable into and removable from the cable sealing unit. Use of modules permits a cable sealing unit to be customized as needed. Cable sealing units incorporating modules are known in the art. An exemplary cable sealing unit including modules is described in WO 2014/005916 A2. The disclosure of WO 2014/005916 A2 is incorporated by reference in its entirety herein.

Figure 5:
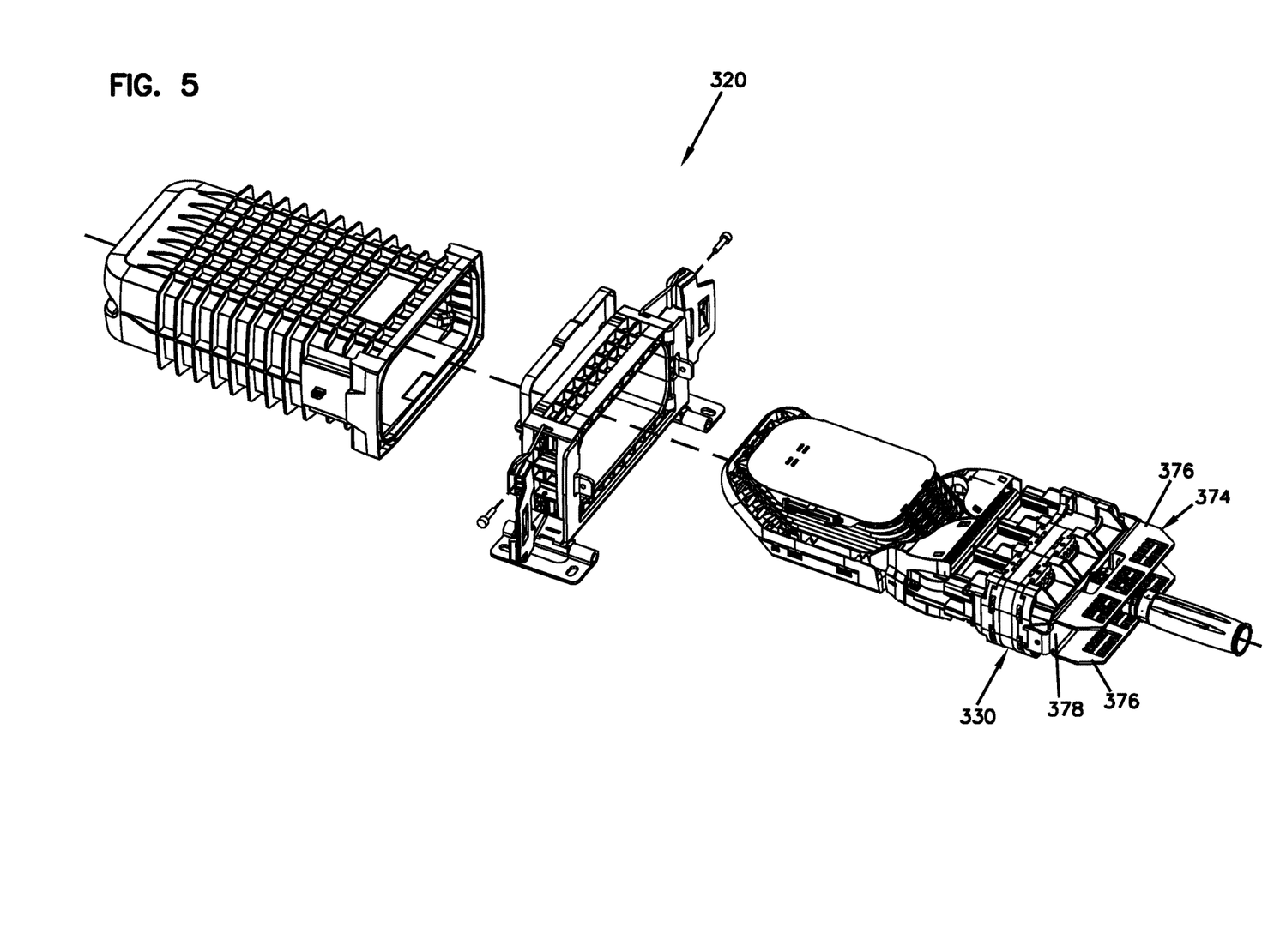
FIG. 5 is an exploded view of a telecommunications enclosure with an exterior cable anchoring structure attached to a housing of a system incorporating a gel seal as disclosed herein.

FIG. 5 depicts a system incorporating a gel seal 20 as disclosed herein, which is part of a telecommunications enclosure 320. The system includes a housing 330 containing a gel seal 20 as disclosed herein. The system further includes an exterior cable anchoring structure 374 attached to the housing 330. The exterior cable anchoring structure 374 includes one or more cable anchoring plates 376. FIG. 5 depicts the exterior cable anchoring structure 374 having two parallel cable anchoring plates interconnected by a bridge plate 378. However, it is appreciated that the exterior cable anchoring structure 374 may include a single cable anchoring plate 376 or three or more cable anchoring plates 376. When two or more cable anchoring plates 376 are present, the cable anchoring plates 376 are generally parallel to each other, however, other configurations of the cable anchoring plates 376 are possible.

Figure 6A:
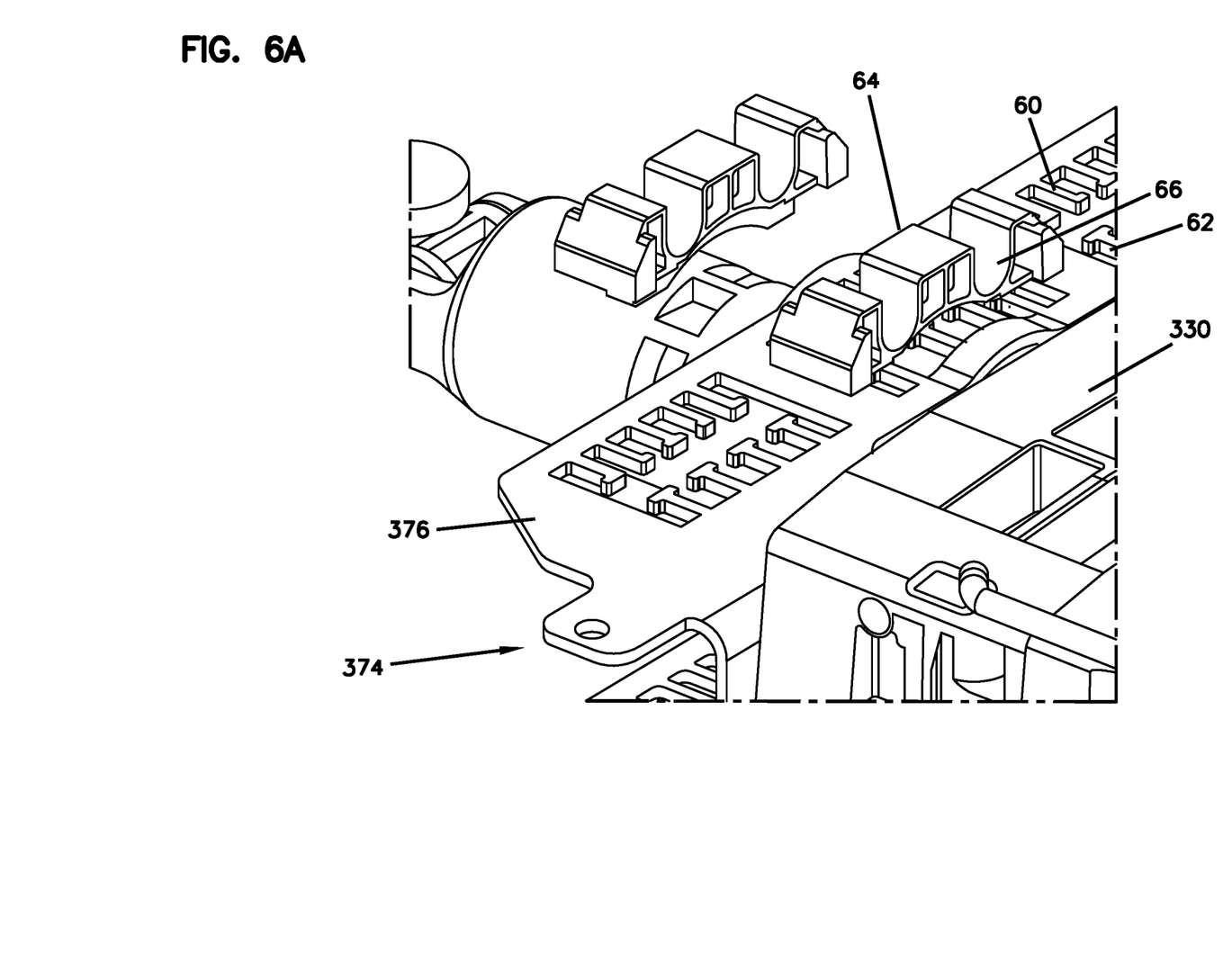
FIG. 6A depicts a cable anchoring plate including a first row of tie mounts and a second row of tie mounts with a flat cable guide positioned on the cable anchoring plate.

The cable anchoring plate(s) 376 includes a first row of cable tie mounts 60 and a second row of cable tie mounts 62 depicted in FIG. 6A.

Figure 6B:
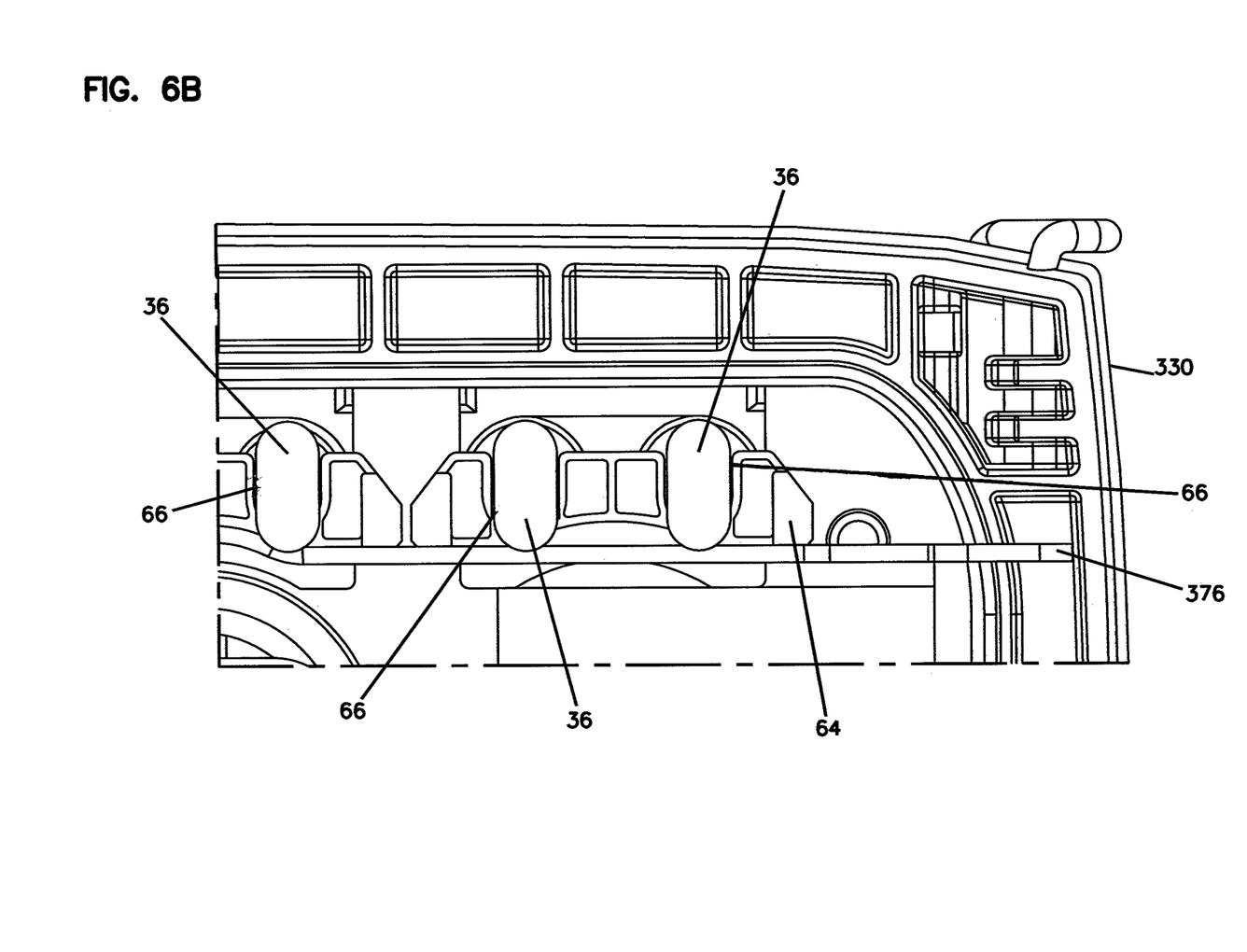
FIG. 6B is an end view of the flat cable guide positioned on the cable anchoring plate of FIG. 6A with flat cables in the flat cable guide.
Figure 6C:
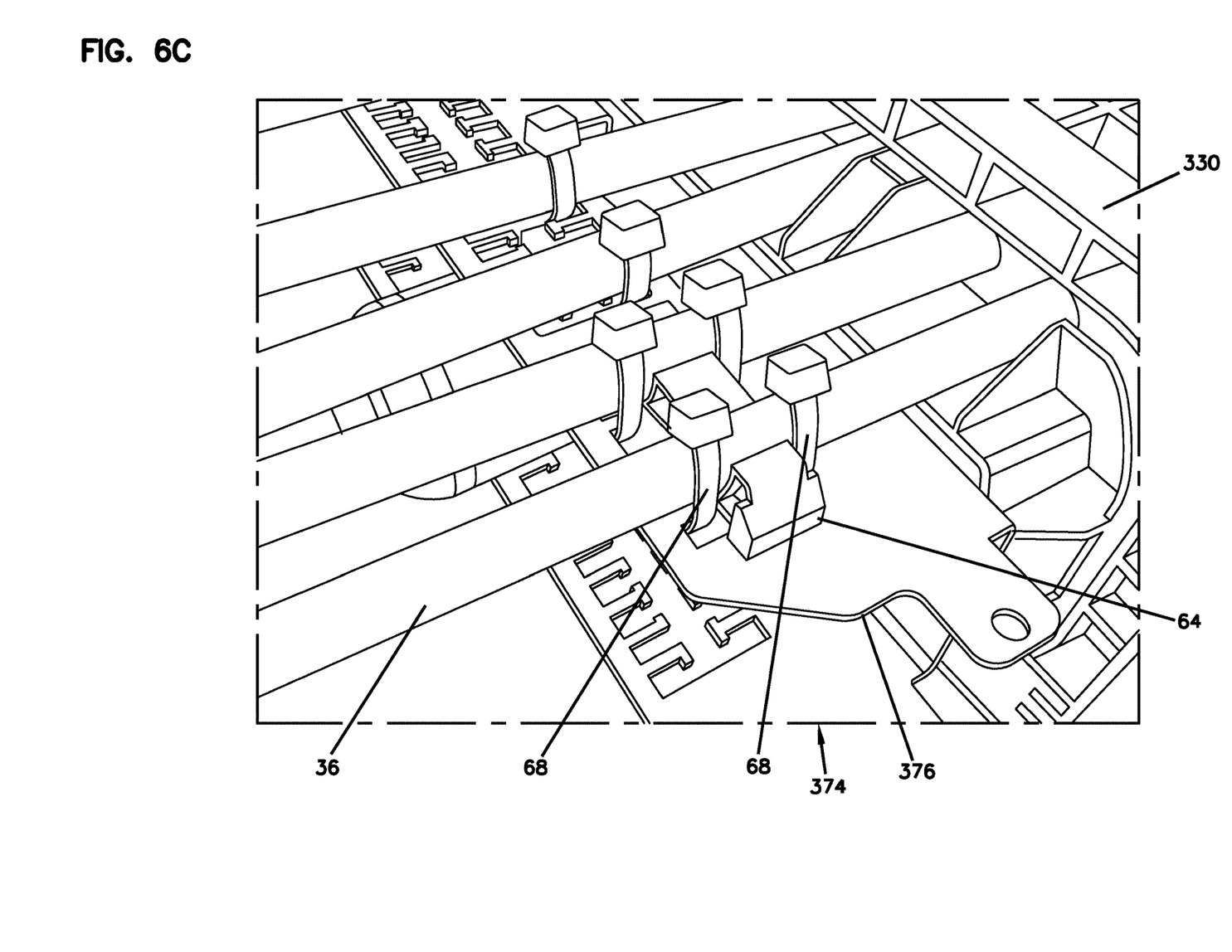
FIG. 6C is a perspective view showing flat cables in the flat cable guide secured to the cable anchoring plate of FIG. 6A with cable ties.

Referring to FIGS. 6A-6C, the system also include a flat cable guide 64 containing one or more channels 66. FIGS. 6A-6C show a flat cable guide 64 having two channels 66. However, it is appreciated that the flat cable guide 64 may include a single channel 66 or three or more channels 66 depending upon the size of flat cable guide 64 and/or the number of cable ports in an associated gel seal 20. FIGS. 6A-6C also depict the channels 66 as U-shaped. It is appreciated that the channels 66 are not limited to the U-shape. For example, the channels 66 can be apertures that can surround the flat cables 36.

The flat cable guide 64 is positioned on the cable anchoring plate 376 between the first row of cable tie mounts 60 and the second row of cable tie mounts 62. The flat cable guide 64 is positioned so that at least a portion of the cable tie mounts in each row 60, 62 are exposed. The flat cable guide 64 is also positioned on the cable anchoring plate 376 so that a mid-point of the channel 66 aligns with the central longitudinal axis A of the cable port 28 (see FIG. 6B). The channel 66 is configured to receive a flat cable 36 extending from the cable port 28.

Generally, a cable tie mount is a structure that prevents a cable tie from sliding off a structure about which the cable tie is tied. In FIGS. 6A and 6C, the cable tie mounts are T-shaped. However, the cable tie mount is not limited to the T-shaped structure depicted. Other exemplary cable tie mounts include tabs, fingers, flanges, lips, bumps, walls, ridges, and rails.

Additionally, the system incorporating a gel seal 20 as disclosed herein includes cable ties 68 (see FIG. 6C). The cable ties 68 are configured to secure the flat cable 36 to a first cable tie mount in the first row of cable tie mounts 60 and a second cable tie mount in the second row of cable tie mounts 62. For example, as shown in FIG. 6C, the cable ties 68 can wrap around the T-shaped, first cable tie mount and the flat cable 36 and the T-shaped, second cable tie mount and the flat cable 36, respectively.

From the foregoing detailed description, it will be evident that modifications and variations can be made in the gel seals disclosed herein and systems containing them without departing from the spirit or scope of the disclosure.

REFERENCE LETTERS/NUMBERS central longitudinal axis A
gel seal 20
gel 22
first end plate 24
second end plate 26
cable port 28
first, circular cross-sectional profile 30
round cable 32
second, elongate cross-sectional profile 34
flat cable 36
collapsible partitions 38
secondary collapsible partitions 40
upper portion 42
lower portion 44
first end plate upper portion 46
first end plate lower portion 48
second end plate upper portion 50
second end plate lower portion 52
upper volume of gel 54
lower volume of gel 56
first row of cable tie mounts 60
second row of cable tie mounts 62
flat cable guide 64
channel 66
cable tie 68
telecommunications enclosure 320
housing 330
exterior cable anchoring structure 374
cable anchoring plate 376
bridge plate 378

What is claimed is:

1. A gel seal comprising:
a volume of a gel between first and second end plates, the gel seal including at least one cable port defining a central longitudinal axis extending through the first end plate, the volume of gel, and the second end plate,
the first and second end plates each including a main body defining a cross-sectional port shape corresponding to the cable port, the cross-sectional port shape including opposite first and second recessed portions positioned on first opposite sides of the central longitudinal axis and first and second opposite non-recessed portions positioned on second opposite sides of the central longitudinal axis between the first and second recessed portions, the first and second end plates each including first and second sets of primary collapsible partitions positioned respectively at the first and second recessed portions of the cross-sectional port shape, the first and second sets of primary collapsible partitions extending generally toward the central longitudinal axis from base ends of the first and second sets of primary collapsible partitions connected to the main bodies to free ends of the first and second sets of primary collapsible partitions, the first and second end plates each also including first and second sets of secondary collapsible partitions positioned respectively at the first and second non-recessed portions of the cross-sectional port shape, the first and second sets of secondary collapsible partitions extending generally toward the central longitudinal axis from base ends of the first and second sets of secondary collapsible partitions connected to the main bodies to free ends of the first and second sets of secondary collapsible partitions, wherein the base ends of the first and second sets of primary collapsible partitions and the free ends of the first and second sets of secondary collapsible partitions cooperate to define an elongate profile, and wherein the base ends of the first and second sets of secondary collapsible partitions and the free ends of the first and second sets of primary collapsible partitions cooperate to define a round profile.

2. The gel seal of claim 1, wherein the first and second sets of the primary and secondary collapsible partitions are a plurality of bendable tabs.

3. The gel seal of claim 1, wherein the gel seal is a module and insertable into and removable from a cable sealing unit.

4. The gel seal of claim 1, wherein the round profile is configured to receive a round cable having a diameter between about 9 and about 12 mm.

5. The gel seal of claim 1, wherein the elongate profile is configured to receive a flat cable having a cross-sectional length of about 16 mm and a cross-sectional width of about 8 mm.

6. The gel seal of claim 1, wherein the gel has a shore hardness between about 24 and about 53 shore 000 hardness.

* * * * *